(12) United States Patent
Hoshino (10) Patent No.: US 12,275,289 B2
(45) Date of Patent: Apr. 15, 2025

(54) VEHICLE AIR CONDITIONER

(71) Applicant: TOYOTA JIDOSHA KABUSHIKI KAISHA, Aichi-ken (JP)

(72) Inventor: Yu Hoshino, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 268 days.

(21) Appl. No.: 18/190,124

(22) Filed: Mar. 27, 2023

(65) Prior Publication Data

US 2023/0382185 A1 Nov. 30, 2023

(30) Foreign Application Priority Data

May 24, 2022 (JP) ................................. 2022-084701

(51) Int. Cl.
*B60H 1/00* (2006.01)
(52) U.S. Cl.
CPC ............................. *B60H 1/00885* (2013.01)

(58) Field of Classification Search
CPC ...... B60H 1/004; B60H 1/00885; B60H 1/034
See application file for complete search history.

(56) References Cited

U.S. PATENT DOCUMENTS

| | | | |
|---|---|---|---|
| 2012/0174602 A1* | 7/2012 | Olivier | B60H 1/004 62/238.1 |
| 2018/0154734 A1* | 6/2018 | Lee | H01M 10/613 |
| 2019/0061470 A1* | 2/2019 | Koberstein | B60H 1/00392 |

FOREIGN PATENT DOCUMENTS

| | | | |
|---|---|---|---|
| JP | 2014-129054 | * | 7/2014 |
| JP | 2014-129054 A | | 7/2014 |

* cited by examiner

*Primary Examiner* — Henry T Crenshaw
(74) *Attorney, Agent, or Firm* — HAUPTMAN HAM, LLP (57) ABSTRACT

The engine, the heater, and the heater core are connected by pipes. When the traveling mode is HEV traveling mode or the engine single traveling mode, a flow path formed of pipes is formed, and the coolant is heated by the engine to heat the heater core. When the traveling mode is EV traveling mode, a flow path including a pipe is formed, and the coolant is heated by the heater to heat the heater core.

4 Claims, 5 Drawing Sheets

VEHICLE AIR CONDITIONER

CROSS-REFERENCE TO RELATED APPLICATION

This application claims priority to Japanese Patent Application No. 2022-084701 filed on May 24, 2022, incorporated herein by reference in its entirety.

BACKGROUND

1. Technical Field

The present disclosure relates to a vehicle air conditioner that heats a heat transfer medium used for air conditioning of a vehicle.

2. Description of Related Art

Japanese Unexamined Patent Application Publication No. 2014-129054 (JP 2014-129054 A) describes a vehicle air conditioner provided in a hybrid electric vehicle. The vehicle air conditioner heats a heater core by guiding waste heat of an engine or a heat transfer medium heated by a heater to the heater core. Then, hot air is obtained by passing the air through the heated heater core. Specifically, the vehicle air conditioner includes a first flow path for heating the heat transfer medium using the waste heat of the engine in a hybrid electric vehicle (HEV) traveling mode (traveling mode using both the engine and the motor as a power source) or in an engine-only traveling mode (traveling mode using only the engine as a power source). The vehicle air conditioner includes a second flow path for heating the heat transfer medium by the heater in an electric vehicle (EV) traveling mode (traveling mode using only the motor as a power source). The vehicle air conditioner also includes a three-way valve that switches between the first flow path and the second flow path. In the vehicle air conditioner, the flow path is switched by the three-way valve such that the heat transfer medium is heated by the heater in the EV traveling mode. Then, in the vehicle air conditioner, the flow path is switched by the three-way valve such that the heat transfer medium is heated using the waste heat of the engine in the HEV traveling mode or in the engine-only traveling mode.

SUMMARY

In the vehicle air conditioner described in JP 2014-129054 A, part of the second flow path used in the EV traveling mode is common to the first flow path used in the HEV traveling mode or in the engine-only traveling mode. Then, in the HEV traveling mode or in the engine-only traveling mode, the heat transfer medium also circulates in the part thereof. On the other hand, in the second flow path, there is a flow path that is closed by the three-way valve such that the heat transfer medium does not circulate in the HEV traveling mode or in the engine-only traveling mode. In addition, in the HEV traveling mode or in the engine-only traveling mode, the temperature of the heat transfer medium staying in the flow path may drop due to the effect of the outside air at a low temperature. When the traveling mode is switched from the HEV traveling mode or the engine-only traveling mode to the EV traveling mode, the heat transfer medium staying in the flow path and having a dropped temperature flows into the heater core. As a result, the temperature of the heater core may drop.

An object of the present disclosure is to suppress a temperature drop of the heat transfer medium circulating in the second flow path when a flow path for heating the heat transfer medium is switched from the first flow path to the second flow path in the vehicle air conditioner that heats the heat transfer medium circulating in the first flow path and the second flow path. The vehicle air conditioner includes the first flow path in which the heat transfer medium is heated by a first heat source, and the second flow path in which the heat transfer medium is heated by a second heat source.

An aspect of the present disclosure is a vehicle air conditioner that heats a heat transfer medium.

The vehicle air conditioner that heats a heat transfer medium includes: a first flow path in which the heat transfer medium used for air conditioning of a vehicle circulates; a second flow path that is partially common to the first flow path and in which the heat transfer medium circulates; a three-way valve that switches between the first flow path and the second flow path; and a control device that controls opening and closing of the three-way valve. In the first flow path, the heat transfer medium is heated by heat from a first heat source. In the second flow path, the heat transfer medium is heated by heat from a second heat source. The second flow path includes a third flow path that is closed by the three-way valve such that the heat transfer medium does not circulate when the first flow path is used as a flow path for heating the heat transfer medium.

When switching of the flow path for heating the heat transfer medium from the first flow path to the second flow path is performed, the control device controls opening and closing of the three-way valve so as to mix the heat transfer medium in the first flow path and the heat transfer medium in the third flow path before the switching.

According to the above configuration, when switching of the flow path for heating the heat transfer medium from the first flow path to the second flow path is performed, a coolant staying in the third flow path and a coolant in the first flow path are mixed together in a state where the first flow path is used as the flow path for heating the heat transfer medium before the switching. When the coolant staying in the third flow path is once mixed with the coolant heated by the first heat source, it is possible to suppress the temperature drop of the coolant circulating in the second flow path although the temperature of the coolant staying in the third flow path drops by the outside air.

When a temperature fluctuation of the heat transfer medium falls below a threshold value after the heat transfer medium in the first flow path and the heat transfer medium in the third flow path are mixed together, the control device may control opening and closing of the three-way valve so as to switch the flow path for heating the heat transfer medium to the second flow path.

When a difference between a temperature of the heat transfer medium in the first flow path and a temperature of the heat transfer medium in the second flow path falls below a threshold value after the heat transfer medium in the first flow path and the heat transfer medium in the third flow path are mixed together, the control device may control opening and closing of the three-way valve so as to switch the flow path for heating the heat transfer medium to the second flow path.

The first heat source may be an internal combustion engine, and the second heat source may be a heater.

According to the present disclosure, in the vehicle air conditioner that heats the heat transfer medium circulating in the first flow path and the second flow path, it is possible to suppress a temperature drop of the heat transfer medium circulating in the second flow path when the flow path for heating the heat transfer medium is switched from the first flow path to the second flow path. The vehicle air conditioner includes the first flow path in which the heat transfer medium is heated by the first heat source, and the second flow path in which the heat transfer medium is heated by the second heat source.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
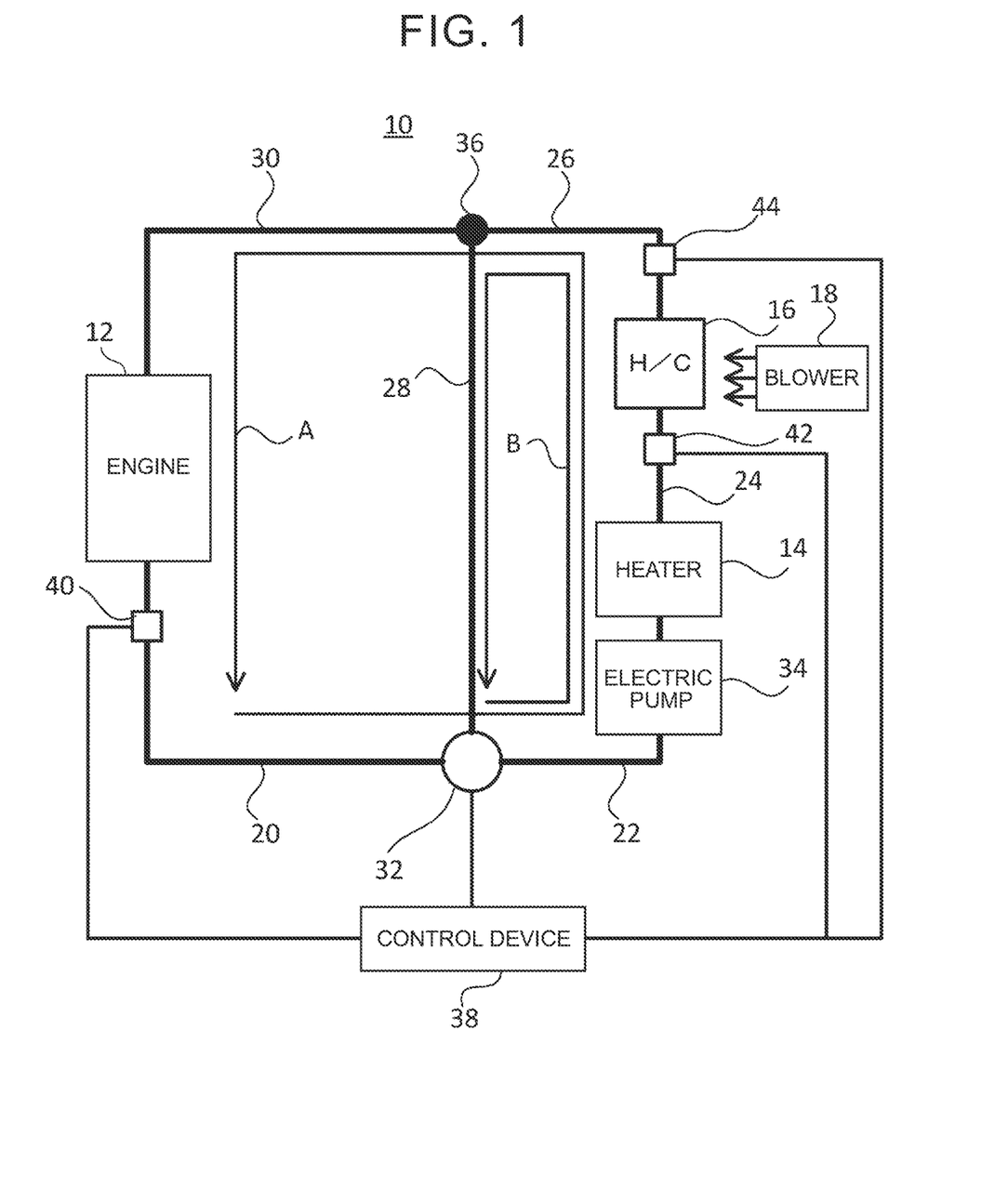
FIG. 1 is a block diagram illustrating a configuration of a vehicle air conditioner.

Referring to FIG. 1, a vehicle air conditioner 10 according to an embodiment will be described. FIG. 1 is a block diagram illustrating a configuration of a vehicle air conditioner 10 according to an embodiment.

The vehicle air conditioner 10 is provided in a hybrid electric vehicle. The vehicle air conditioner 10 is an apparatus for realizing a heating system in an air-conditioning unit (A/C) mounted on a hybrid electric vehicle.

Hybrid electric vehicle includes an engine 12, which is an exemplary internal combustion engine, and a motor (not shown). Hybrid electric vehicle travels in accordance with one of an EV traveling mode, a HEV traveling mode, and an engine-only traveling mode. EV traveling mode is a mode in which the vehicles travel using only the motor as a power source. In EV running mode, the motor generates a driving force by electric power supplied from the battery. In EV traveling mode, hybrid electric vehicle travels by driving force generated from the motor. HEV traveling mode is a mode in which vehicles travel using both the engine 12 and the motor as a power source. The engine-only traveling mode is a mode in which the vehicle travels using only the engine as a power source. The vehicle air conditioner 10 may be provided in a plug-in hybrid electric vehicle.

The vehicle air conditioner 10 heats the heater core 16 by guiding waste heat of the engine 12 or a heat transfer medium heated by the heater 14 to the heater core 16. Then, the air from the blower 18 is passed through the heated heater core 16, whereby hot air is obtained. In this way, a heating system in an air conditioner unit (A/C) mounted on hybrid electric vehicle is realized. The heater 14 is, for example, an electric heater that heats the coolant.

The vehicle air conditioner 10 includes pipes 20 to 30, a three-way valve 32, and an electric pump 34. The engine 12, the heater 14, the heater core 16, the three-way valve 32, and the electric pump 34 are connected by pipes 20 to 30. The coolant for cooling the engine 12 circulates through the pipes 20 to 30. The coolant is an example of a heat transfer medium. The engine 12 is provided with a water pump for circulating the coolant in the engine 12.

The engine 12 and the three-way valve 32 are connected by a pipe 20. The three-way valve 32 and the heater 14 are connected by a pipe 22. Between the three-way valve 32 and the heater 14, an electric pump 34 for circulating the coolant in 30 from the pipe 20 is provided. Note that this installation example is merely an example. The heater 14 and the heater core 16 are connected by a pipe 24. The heater core 16 and the three-way valve 32 are connected by a pipe 26 and a pipe 28. Specifically, one end of the pipe 26 is connected to the heater core 16. The other end of the pipe 26 is connected to one end of the pipe 28 at a connection point 36. The other end of the pipe 28 is connected to the three-way valve 32. The heater core 16 and the engine 12 are connected by a pipe 26 and a pipe 30. Specifically, the other end of the pipe 26 is connected to one end of the pipe 30 at the connection point 36. The other end of the pipe 30 is connected to the engine 12.

The three-way valve 32 is an electrically operated three-way valve. The three-way valve 32 switches a flow path through which the coolant circulates. The state of the three-way valve 32 includes a first state, a second state, and a third state. By switching the state, the three-way valve 32 switches the flow path.

The first state is a state in which the coolant can be circulated from the pipe to the pipe 22. The first state is a state in which circulation of the coolant from the pipe 28 to the pipe 22 is impossible. When the state of the three-way valve 32 is the first state, the flow path A including the pipes 20, 22, 24, 26, and 30 is formed. The flow path A corresponds to an example of the first flow path.

The second state enables circulation of the coolant from the pipe 28 to the pipe 22. The second state is a state in which circulation of the coolant from the pipe 20 to the pipe 22 is impossible. When the state of the three-way valve 32 is the second state, the flow path B including the pipes 22, 24, 26, and 28 is formed. The flow path A and the flow path B have a common flow path formed by the pipes 22, 24, and 26. As described above, the flow path A and the flow path B are partially common flow paths. The flow path B corresponds to an example of the second flow path.

The third state enables circulation of the coolant from the pipe 20 to the pipe 22, and also enables circulation of the coolant from the pipe 28 to the pipe 22. In the third state, all the valves constituting the three-way valve 32 are open. The state of the three-way valve 32, when the third state, the flow path consisting of all the pipes 20 30 (flow path consisting flow path A,B) is formed. Hereinafter, a flow path including all the pipes 20 to 30 is referred to as a "flow path C".

In the flow path B, the coolant does not pass through the engine 12. Therefore, the length of the path through which the coolant circulates is shorter than that of the flow path A. Therefore, in the flow path B, the coolant can be circulated more efficiently than in the flow path A. Therefore, the heating efficiency of the coolant is high.

Further, the vehicle air conditioner 10 includes a control device 38. The control device 38 controls switching of the flow path by controlling the state of the three-way valve 32.

The function of the control device 38 is realized by, for example, cooperation of hardware and software. For example, a processor such as Central Processing Unit(CPU) reads and executes a program stored in the memory of the control device 38, thereby realizing the function of the control device 38. The program is stored in the memory via a recording medium such as a CD or a DVD, or via a communication path such as a network. The functions of the respective units of the control device 38 may be realized by Application Specific Integrated Circuit(ASIC), Field Programmable Gate Array(FPGA), or another programmable logic device. The function of each unit of the control device 38 may be realized by hardware such as an electronic circuit.

Further, the vehicle air conditioner 10 includes temperature sensors 40, 42, and 44. The temperature sensor 40 is installed near the coolant outlet of the engine 12. The temperature sensor 40 measures the temperature of the coolant flowing out of the engine 12. Then, the temperature sensor 40 outputs the measured value to the control device 38. The temperature sensor 42 is installed near the coolant inlet of the heater core 16. The temperature sensor 42 measures the temperature of the coolant flowing into the heater core 16. Then, the temperature sensor 42 outputs the measured value to the control device 38. The temperature sensor 44 is installed in the vicinity of the coolant outlet of the heater core 16. The temperature sensor 44 measures the temperature of the coolant flowing out of the heater core 16. Then, the temperature sensor 44 outputs the measured value to the control device 38. An example of the installation of the temperature sensor is merely an example. A temperature sensor, such as in the vicinity of the coolant inlet of the engine 12, may be installed.

When the traveling mode of hybrid electric vehicle is HEV traveling mode or the engine-only traveling mode, the control device 38 switches the state of the three-way valve 32 to the first state. As a result, the flow path A is formed. The coolant flowing into the heater core 16 is heated by the waste heat of the engine 12. The coolant flowing into the heater core 16 is also heated by the heater 14.

When the traveling mode of hybrid electric vehicle is EV traveling mode, the control device 38 switches the state of the three-way valve 32 to the second state. As a result, the flow path B is formed. The coolant flowing into the heater core 16 is not heated by the engine 12. The coolant flowing into the heater core 16 is heated by the heater 14.

Figure 2:
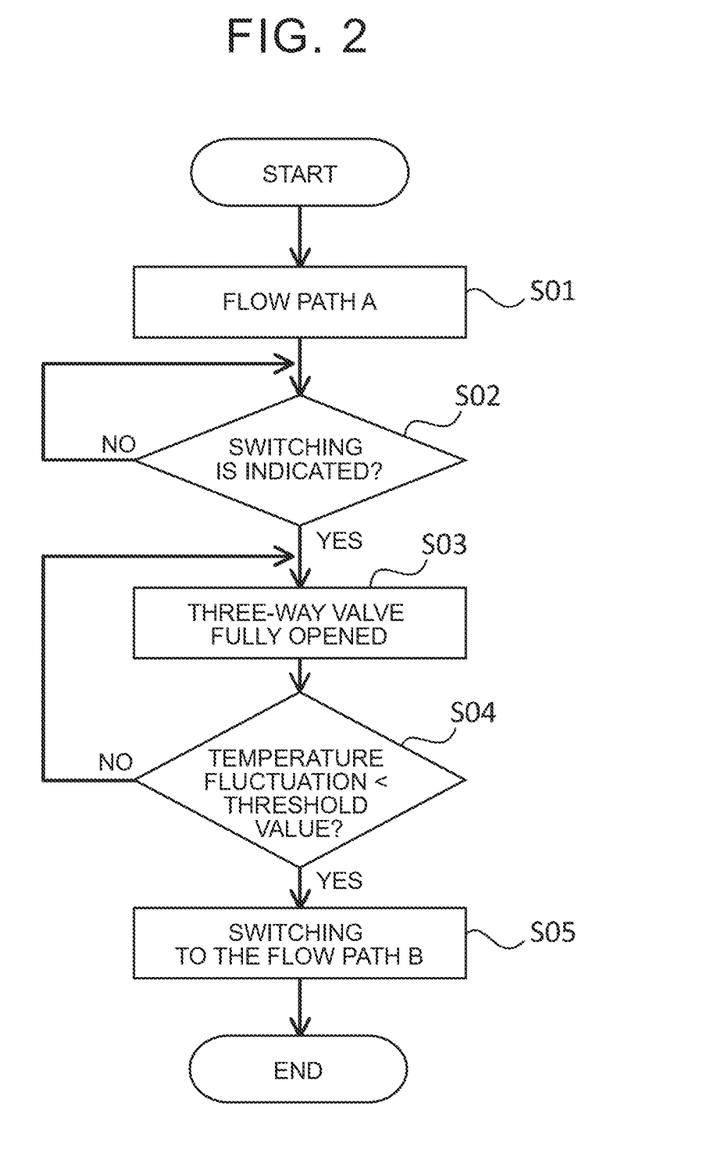
FIG. 2 is a flowchart illustrating an operation of the vehicle air conditioner.
Figure 3:
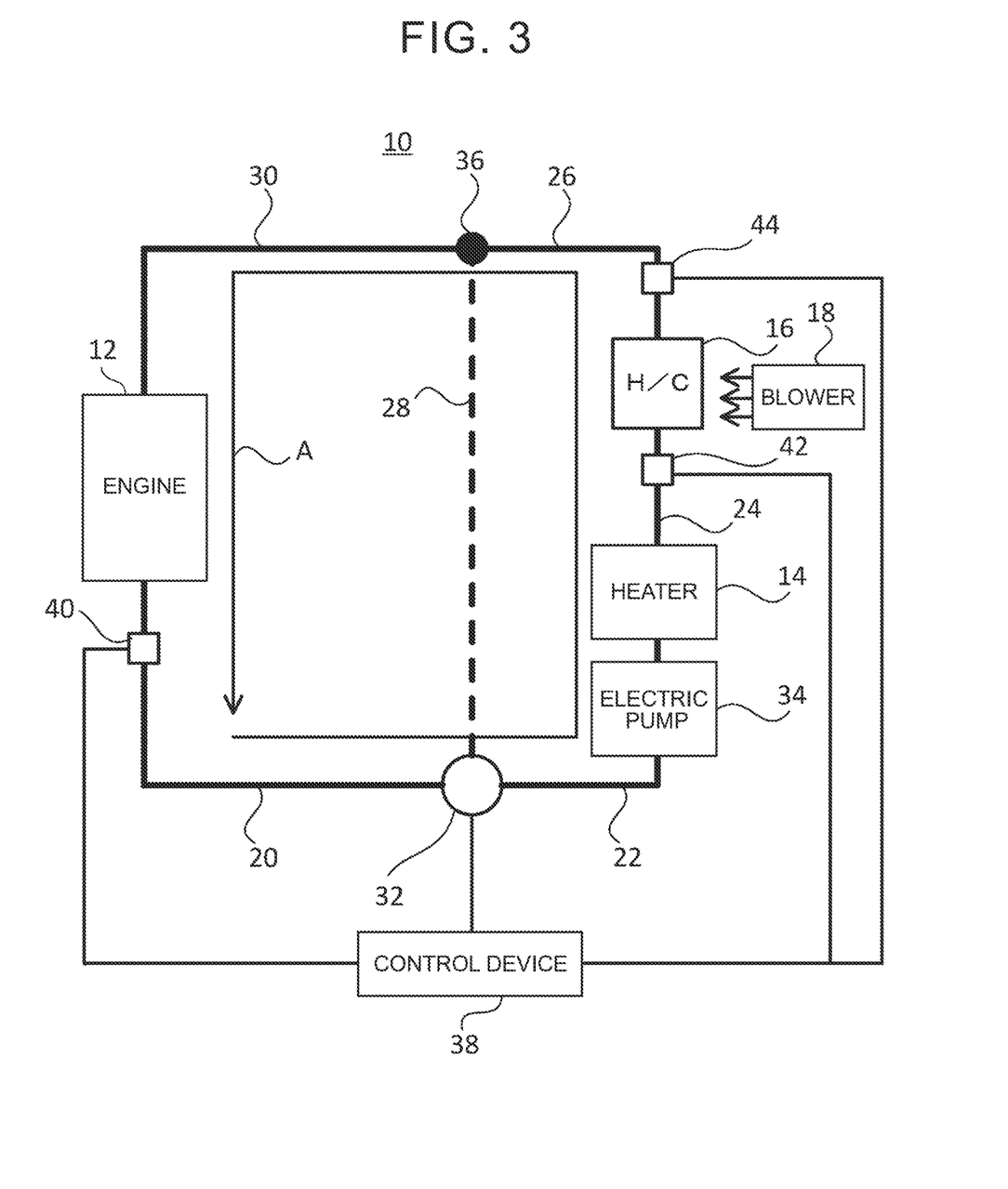
FIG. 3 is a diagram illustrating the flow path A in HEV running mode or in the engine-only running mode.
Figure 4:
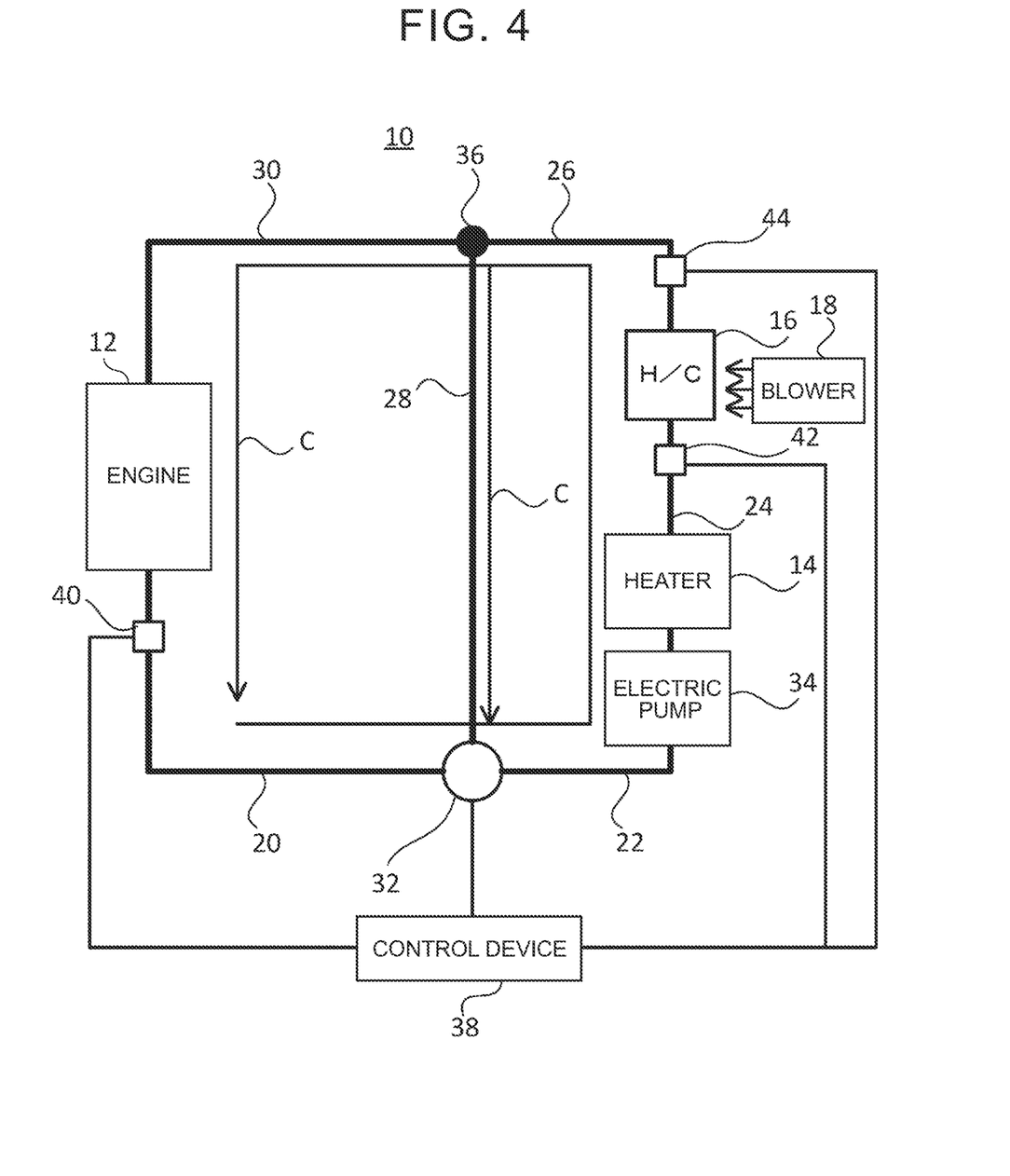
FIG. 4 is a block diagram showing the flow path C when the three-way valve is fully opened.
Figure 5:
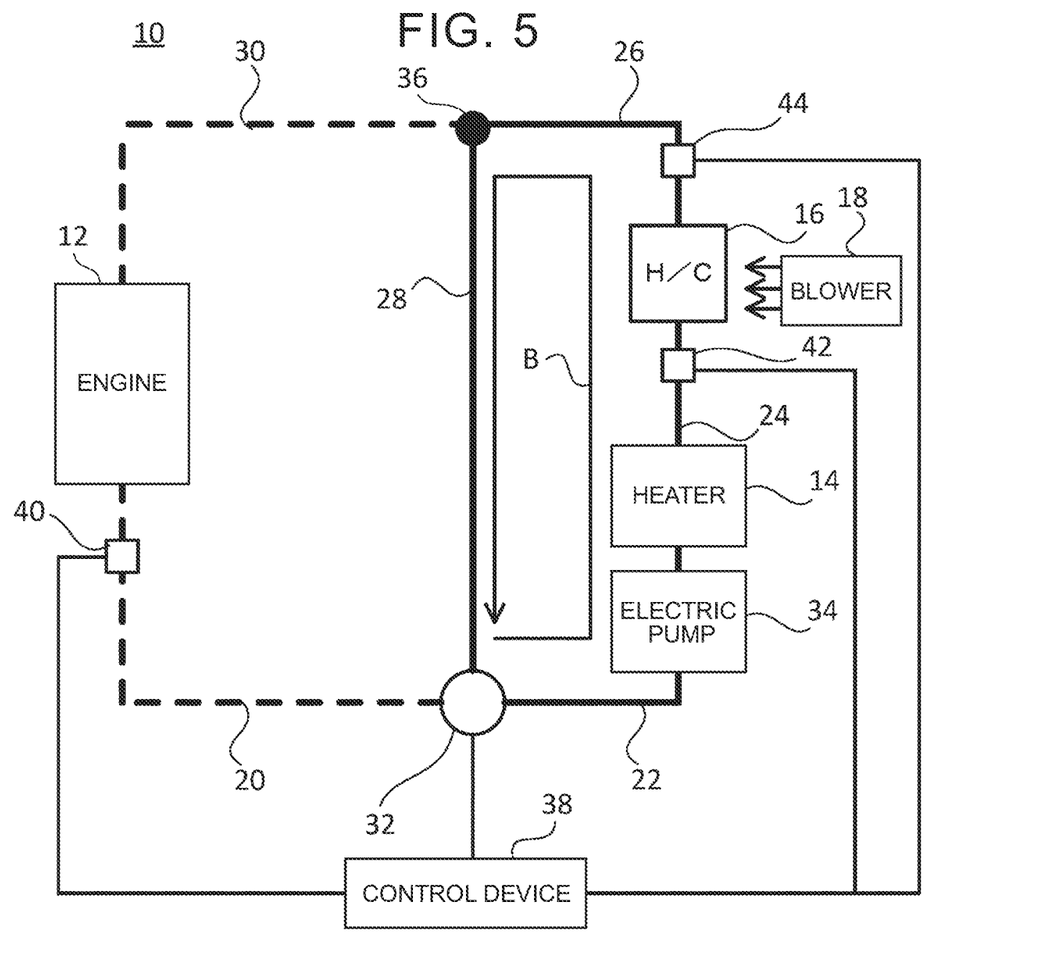
FIG. 5 is a block diagram showing the flow path B in EV running mode.

Hereinafter, the operation of the vehicle air conditioner 10 will be described with reference to FIGS. 2 to 5. FIG. 2 is a flowchart showing the operation of the vehicle air conditioner 10. FIG. 3 to FIG. 5 are block diagrams illustrating a configuration of the vehicle air conditioner 10.

Here, it is assumed that hybrid electric vehicle traveling mode is HEV traveling mode or the single-engine traveling mode. In this instance, the control device 38 forms the flow path A by switching the state of the three-way valve 32 to the first state (S01).

FIG. 3 shows a flow path A. Among the pipes 20 to 30, the pipes 20, 22, 24, 26, and 30 through which the coolant circulates are indicated by solid lines. In the pipes 20 to 30, the pipes 28 through which the coolant does not circulate are indicated by broken lines.

In the first state, no coolant flows from the pipe 28 to the pipe 22. Therefore, the coolant in the pipe 28 does not circulate. The coolant in the pipe 28 stays in the pipe 28. That is, the pipe 28 is a pipe that is closed by the three-way valve 32 and does not circulate the coolant. The pipe 28 corresponds to an example of a pipe forming the third flow path. The coolant staying in the pipe 28 is not heated by the waste heat of the engine 12 or the heater 14. Therefore, the temperature of the coolant staying in the pipe 28 is lower than the temperature of the coolant circulating in the flow path A due to the influence of the low-temperature outside air.

Upon receiving the instruction to switch the flow path (S02,Yes), the control device 38 fully opens the three-way valve 32 (S03). That is, the control device 38 forms the flow path C by switching the state of the three-way valve 32 to the third state. When the traveling mode of hybrid electric vehicle is switched from HEV traveling mode or the engine-only traveling mode to EV traveling mode, an instruction to switch the flow path is outputted to the control device 38. In accordance with the switching instruction, the control device 38 switches the state of the three-way valve 32 to the third state.

In FIG. 4, a flow path C is shown. All of the pipes 20 to 30 are shown in solid lines. The coolant circulates through the pipes 20 to 30. The coolant staying in the pipe 28 flows into the pipe 22. The coolant staying in the pipe 28 is mixed with the coolant circulating in the flow path A.

The control device 38 does not switch the status of the three-way valve 32 when the instruction to switch the flow path is not received (S02,No). Then, the control device 38 maintains the state of the three-way valve 32 in the first state.

The control device 38 determines whether the temperature variation of the coolant near the outlet of the heater core 16 is less than the temperature variation threshold value based on the temperature measured by the temperature sensor 44 (S04). The temperature variation threshold value is a preset value. For example, the control device 38 determines whether a temperature variation per unit time (e.g., per second) has fallen below a temperature variation threshold value (e.g., X° C./second).

When the temperature variation of the coolant in the vicinity of the outlet of the heater core 16 becomes less than the temperature variation threshold value (S04,Yes), the control device 38 switches the flow path to the flow path B by switching the state of the three-way valve 32 to the second state (S05). If the temperature variation of the coolant is not less than the temperature variation threshold values (S04,No), the control device 38 does not switch the status of the three-way valve 32. Then, the control device 38 maintains the state of the three-way valve 32 in the third state. When the variation of the temperature measured by the temperature sensor 42 becomes less than the temperature variation threshold value, or when the variation of the average value between the temperature measured by the temperature sensor 42 and the temperature measured by the temperature sensor 44 becomes less than the temperature variation threshold value, the control device 38 may switch the state of the three-way valve 32 to the second state.

In FIG. 5, a flow path B is shown. Among the pipes 20 to 30, the pipes 22, 24, 26, and 28 through which the coolant circulates are indicated by solid lines. Among the pipes 20 to 30, the pipes 20 and 30 through which the coolant does not circulate are indicated by broken lines.

As described above, when the traveling mode is switched from HEV traveling mode or the engine-only traveling mode to EV traveling mode, the flow path through which the coolant circulates is not directly switched from the flow path A to the flow path B. The flow path through which the coolant circulates is once switched to the flow path C. Thereafter, the flow path through which the coolant circulates is switched to the flow path B. As a result, it is possible to suppress a decrease in the temperature of the coolant flowing into the heater core 16 as compared with a case where the flow path is directly switched from the flow path A to the flow path B. This point will be described below.

When the flow path is directly switched from the flow path A to the flow path B, the coolant staying in the pipe 28 mixes with the coolant (heated coolant) in the pipes 22, 24, and 26. When the coolant staying in the pipe 28 is cooled by the low-temperature outside air, the temperature of the coolant circulating in the flow path B decreases due to the mixing.

On the other hand, when the flow path is not directly switched from the flow path A to the flow path B and the flow path is switched to the flow path C, the coolant staying in the pipe 28 mixes with the coolant heated in the flow path A (the coolant in the pipes 20, 22, 24, 26, and 30). As a result, the temperature of the coolant circulating in the flow path C decreases. Even in this case, since the coolant staying in the pipe 28 is mixed with the coolant in the flow path A having a larger capacity than the flow path B, the degree of temperature decrease of the coolant after mixing is less than in the case of mixing with the coolant in the flow path B having a smaller capacity. That is, in a case where the flow path is switched from the flow path A to the flow path C, the degree of temperature decrease of the coolant after mixing is less than in a case where the flow path is directly switched from the flow path A to the flow path B. Therefore, by switching the flow path to the flow path C, the temperature drop of the coolant after mixing is suppressed. Then, it is possible to suppress the temperature drop of the heater core 16.

If the temperature fluctuation of the coolant in the vicinity of the outlet of the heater core 16 is less than the temperature fluctuation threshold value, even if the flow path is switched from the flow path C to the flow path B, it is estimated that the possibility that the temperature of the coolant circulating in the flow path B suddenly decreases is low. Therefore, the flow path is switched from the flow path C to the flow path B.

Also, the level (e.g., flow rate) of the blower 18 may be controlled based on the temperature of the coolant. For example, control to increase the flow rate of the blower 18 may be performed as the temperature of the coolant increases. In such a control, when the temperature of the coolant rapidly decreases, the flow rate of the blower 18 rapidly decreases. According to the embodiment, since it is possible to suppress a decrease in the temperature of the coolant flowing into the heater core 16, it is possible to suppress a decrease in the flow rate of the blower 18.

As another example of the process of S04 of steps, when a predetermined period of time has elapsed from the time when the three-way valve 32 is fully opened, the control device 38 may switch the flow path to the flow path B. The time is a time calculated based on the capacity of the pipes 20 to 30 and the coolant. The time is a time period during which the temperature fluctuation of the coolant in the vicinity of the outlet of the heater core 16 is estimated to be less than the temperature fluctuation threshold value.

As yet another example, when the level (e.g., flow rate) of the blower 18 is controlled based on the temperature of the coolant, if the flow rate variation per unit time of the blower 18 is less than a predetermined level variation threshold value (e.g., Y %/sec), the control device 38 may switch the flow path to the flow path B. The level variation threshold value is a value at which a temperature variation of the coolant in the vicinity of the outlet of the heater core 16 is estimated to be less than the temperature threshold value.

As yet another example, if the difference between the temperature measured by the temperature sensor 40 (i.e., the temperature of the coolant flowing out of the engine 12) and the temperature measured by the temperature sensor 44 (i.e., the temperature of the coolant flowing out of the heater core 16) is less than a predetermined temperature difference threshold value, the control device 38 may switch the flow path to the flow path B. If the temperature difference is less than the temperature difference threshold value, it is presumed that the temperature of the coolant in the pipes 20 to 30 is uniform or close to the temperature difference threshold value, so that the control device 38 switches the flow path to the flow path B. Instead of the temperature measured by the temperature sensor 44, the temperature difference may be calculated using the temperature measured by the temperature sensor 42.

Figure 6:
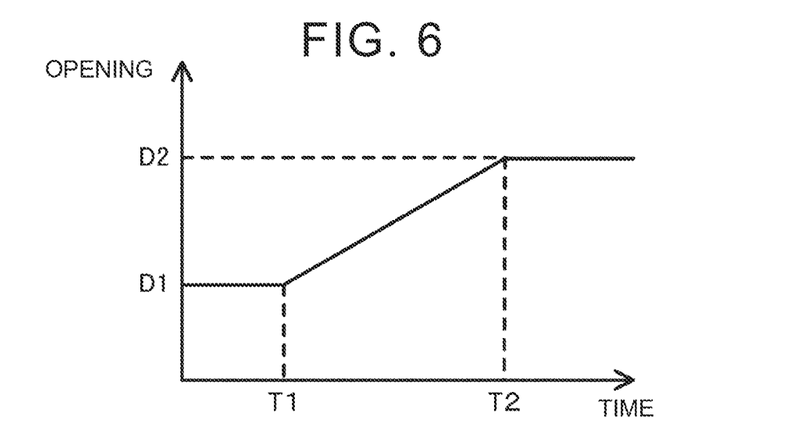
FIG. 6 is a graph showing a temporal change in the opening degree of the three-way valve.

Further, the control device 38 may gradually increase the opening degree of the three-way valve 32. An example is shown in FIG. 6. The horizontal axis in FIG. 6 represents time. The vertical axis in FIG. 6 indicates the opening degree of the three-way valve 32.

The time T1 is a timing at which the control device 38 receives an instruction to switch the flow path. The opening degree D1 at this time is an opening degree at which the flow path A is formed. The control device 38 gradually increases the opening degree from the time T1 to the time T2. The opening degree D2 is fully opened. The opening degree D2 is an opening degree at which the flow path C is formed. By gradually increasing the opening degree, the coolant that has stayed in the pipe 28 gradually mixes with the coolant in the flow path A. Therefore, the temperature change of the coolant in the flow path C can be made gentle. In the example shown in FIG. 6, the opening degree is changed linearly. However, the opening degree may be changed stepwise.

In the above-described embodiment, the engine 12 is used as the first heat source. The heater 14 is used as the second heat source. However, the type and combination of heat sources are not limited thereto. For example, a fuel cell may be used as the first heat source. A heat pump may be used as the second heat source. For example, the vehicle air conditioner 10 may be provided in a fuel cell electric vehicle where the fuel-cell is mounted as the first heat source instead of the engine 12. In this case, when the flow path A is formed, the coolant is heated by the heat from the fuel cell.

What is claimed is:

1. A vehicle air conditioner that heats a heat transfer medium, comprising:
    a first flow path in which the heat transfer medium used for air conditioning of a vehicle circulates;
    a second flow path that is partially common to the first flow path and in which the heat transfer medium circulates;
    a three-way valve that switches between the first flow path and the second flow path; and
    a control device that controls opening and closing of the three-way valve, wherein:
    in the first flow path, the heat transfer medium is heated by heat from a first heat source;
    in the second flow path, the heat transfer medium is heated by heat from a second heat source;
    the second flow path includes a third flow path that is closed by the three-way valve such that the heat transfer medium does not circulate when the first flow path is used as a flow path for heating the heat transfer medium; and
    when switching of the flow path for heating the heat transfer medium from the first flow path to the second flow path is performed, the control device controls opening and closing of the three-way valve so as to mix the heat transfer medium in the first flow path and the heat transfer medium in the third flow path before the switching.

2. The vehicle air conditioner according to claim 1, wherein when a temperature fluctuation of the heat transfer medium falls below a threshold value after the heat transfer medium in the first flow path and the heat transfer medium in the third flow path are mixed together, the control device controls opening and closing of the three-way valve so as to switch the flow path for heating the heat transfer medium to the second flow path.

3. The vehicle air conditioner according to claim 1, wherein when a difference between a temperature of the heat transfer medium in the first flow path and a temperature of the heat transfer medium in the second flow path falls below a threshold value after the heat transfer medium in the first flow path and the heat transfer medium in the third flow path are mixed together, the control device controls opening and closing of the three-way valve so as to switch the flow path for heating the heat transfer medium to the second flow path.

4. The vehicle air conditioner according to claim 1, and wherein:
 the first heat source is an internal combustion engine; and
 the second heat source is a heater.

\* \* \* \* \*